US005545349A

United States Patent [19]

Kurii et al.

[11] Patent Number: 5,545,349

[45] Date of Patent: Aug. 13, 1996

[54] BLEACHING COMPOSITION

[75] Inventors: Jun Kurii; Noboru Nomura; Masami Itoh; Kozo Ohira; Masaki Tsumadori, all of Tochigi; Akira Matsunaga, Wakayama; Akio Kimura, Wakayama; Shigetoshi Suzue, Wakayama, all of Japan

[73] Assignee: Kao Corporation, Tokyo, Japan

[21] Appl. No.: 210,418

[22] Filed: Mar. 18, 1994

Related U.S. Application Data

[63] Continuation of Ser. No. 598,631, filed as PCT/JP90/00943, published as WO91/03542, Mar. 21, 1991, abandoned.

[30] Foreign Application Priority Data

| | | | |
|---|---|---|---|
| Sep. 11, 1989 | [JP] | Japan | 1-235362 |
| Oct. 3, 1989 | [JP] | Japan | 1-258318 |
| Jan. 24, 1990 | [JP] | Japan | 2-15660 |
| Apr. 24, 1990 | [JP] | Japan | 2-108235 |

[51] Int. Cl.[6] .............................. C09K 3/00; C01B 15/10

[52] U.S. Cl. ................................ 252/186.38; 252/186.39; 252/186.26

[58] Field of Search ......................... 252/186.38, 186.39, 252/186.42, 186.26

[56] References Cited

U.S. PATENT DOCUMENTS

| | | | |
|---|---|---|---|
| 4,421,668 | 12/1983 | Cox et al. | 252/174.12 |
| 4,606,838 | 8/1986 | Burns | 252/94 |
| 4,800,038 | 1/1989 | Broze et al. | 252/174.17 |
| 4,853,143 | 8/1989 | Hardy et al. | 252/102 |
| 4,957,647 | 9/1990 | Zielske | 252/186.38 |
| 5,002,691 | 3/1991 | Bolkan et al. | 252/186.29 |
| 5,296,161 | 3/1994 | Wiersema et al. | 252/186.38 |

FOREIGN PATENT DOCUMENTS

| | | |
|---|---|---|
| 6078695 | 6/1981 | Japan . |
| 0001299 | 1/1985 | Japan . |
| 1166899 | 7/1986 | Japan . |
| 1197697 | 9/1986 | Japan . |
| 2004794 | 1/1987 | Japan . |
| 2100598 | 5/1987 | Japan . |
| 2133964 | 6/1987 | Japan . |

*Primary Examiner*—Gary Geist
*Assistant Examiner*—Joseph D. Anthony
*Attorney, Agent, or Firm*—Birch, Stewart, Kolasch & Birch, LLP

[57] ABSTRACT

A bleaching composition comprising:

(a) Hydrogen peroxide or peroxide that produces hydrogen peroxide in aqueous solution; and (b) An organic acid peroxide precursor that produces organic acid peroxide by reacting with said hydrogen peroxide or peroxide that produces hydrogen peroxide in aqueous solution, wherein said organic acid peroxide is represented by general formula (I):

$$R^1O-(AO)_n-R^2-\overset{\overset{O}{\|}}{C}OOH \qquad (I)$$

wherein $R^1$ represents a straight chain or branched chain alkyl or alkenyl group having 1–5 carbon atoms, $R^2$ represents a straight chain or branched chain alkylene group having 1–8 carbon atoms or a phenylene group that may be substituted with a straight chain or branched chain alkyl group having 1–5 carbon atoms, A represent identical or different alkylene groups having from 2 to 4 carbon atoms, and n represents an integer from 0–100.

14 Claims, No Drawings

BLEACHING COMPOSITION

This application is a continuation of application Ser. No. 07/598,631, filed as PCT/JP90/00943, Jul. 23, 1990, published as WO91/03542, Mar. 21, 1991,now abandoned.

FIELD OF THE INVENTION

The present invention relates to a bleaching composition that is non-irritating and demonstrates superior bleaching strength and, more particularly, to a bleaching composition that is suited for the removal of hard, surface soiling.

Soiling in locations that are difficult to clean such as lavatories, bathrooms, bathtubs and drain pipes is removed with considerable difficulty with ordinary detergents or bleaching cleaners that are used primarily for the purpose of cleaning.

The bleaching action or foaming action of compositions having chlorine-based or oxygen-based bleaching agents as the main soiling removal ingredients are useful in the removal of such soiling.

The blackening of bathroom ceilings, bathroom tile joints, plastic walls and triangular corners in kitchens is caused by the pigment produced by the mold, Cladosporium. In addition, when flush toilets are used for an extended period of time, although there is an accumulation of colored soiling on the inner surfaces, surfaces in contact with standing water and especially in water-sealed areas, this soiling is mainly inorganic substances such as calcium phosphate and iron oxide, organic waste products such as crude protein and bile degradation products, and microorganisms or their metabolites.

Since it is difficult to remove these types of hard surface soiling with cleansers and surface activators alone, liquid or spray type bleaching compositions are presently used that use chlorine-based bleaching agents such as sodium hypochlorite.

However, although bleaches for hard surface soiling which use hypochlorous acid demonstrate superior performance, there is a large risk to the eyes and skin. Sprays in particular are not suited for mold growing on bathroom ceilings. Moreover, such bleaches have their own peculiar chlorine smell. As such, not only is there reluctance to using such bleaches in confined areas such as in bathrooms and lavatories, when these bleaches are mistakenly used in combination with acidic cleaners, a toxic gas is produced.

In recent years, studies have been conducted on bleaches for hard surface soiling that use chlorine-based bleaching agents that do not have the above risks. For example, Japanese Patent Laid-Open No. 1299/1985 discloses a bleach suitable for mold removal containing hydrogen peroxysulfate and inorganic peroxide, Japanese Patent Laid-Open No. 4794/1987 discloses a mold remover composition that uses a combination of hydrogen peroxide or sodium percarbonate, bleaching activator and hydrogen peroxydisulfate, Japanese Patent Laid-Open Publication No. 100598/1987 discloses a mold remover containing peroxide and colloidal silica, and Japanese Patent Laid Open Publications Nos. 197697/1986 and 133964/1987 disclose a bleach for lavatory use that uses an oxygen-based bleaching agent.

In addition, although soiling, similar to that found in lavatories such as protein, fats, slime and scaling, etc., adhere to the drain pipes of kitchens and bathrooms as well as in the pipes of bathtubs, etc., oxygen-based bleaches are also used for the removal of these types of soiling (such as in Japanese Patent Laid-Open Nos. 78695/1981 and 166899/1986).

Oxygen-based bleaches have a weaker bleaching strength in comparison to chlorine-based bleaches. Examples of superior bleaching activators for increasing the bleaching strength of oxygen-based bleaches include tetraacetyldiamine, tetracetylglycoluryl, and pentaerythritol tetraacetate. However, since these bleaching activators produce peracetic acid as the source of bleaching activation, they have a strong irritating odor that makes their practical application as bleaches for hard surface soiling difficult.

SUMMARY OF THE INVENTION

Properties such as a high degree of bleaching strength, duration of bleaching strength of at least thirty minutes, and the absence of a foul or irritating odor are required for substances used as sources of bleaching activation in bleaches for hard surface soiling that use oxygen-based bleaching agents. Accordingly, as a result of earnest research regarding sources of bleaching activation that satisfy the above conditions, the inventors perfected the present invention by discovering that specific organic acid peroxides have no irritating odor while demonstrating superior bleaching effects.

In other words, the present invention provides a bleaching composition containing the following:

(a) Hydrogen peroxide or peroxide that produces hydrogen peroxide in aqueous solution; and, (b) An organic acid peroxide precursor that produces organic acid peroxide represented with the general formula:

$$R^1O-(AO)_n-R^2-\overset{\overset{\displaystyle O}{\|}}{C}OOH \qquad (I)$$

(wherein $R^1$ represents a straight chain or branched chain alkyl or alkenyl group having 1–5 carbon atoms, $R^2$ represents a straight chain or branched chain alkylene group having 1–8 carbon atoms or a phenylene group that may be substituted with a straight chain or branched chain alkyl group having 1–5 carbon atoms, n number of A represent identical or different alkylene groups having from 2 to 4 carbon atoms, and n represents an integer from 0–100) by reacting with hydrogen peroxide or a peroxide that produces hydrogen peroxide in aqueous solution.

$R_1$ and $R_2$ may be optionally substituted groups such as methoxy or ethoxy groups. 1–5 organic acid peroxide precursors are occasionally preferable when $R_1$ $R_2$ are alkylene or phenylene groups with $R_1$ having 1–4 carbon atoms and $R_2$ having 1–3 carbon atoms, A has 2–3 carbons and n is from 0 to 20.

Examples of peroxides that produce hydrogen peroxide in aqueous solution include sodium percarbonate, sodium tripolyphosphate and hydrogen peroxide addition products, sodium pyrophosphate and hydrogen peroxide addition products, urea and hydrogen peroxide addition products, $4Na_2SO_4 \cdot 2H_2O_2 \cdot NaCl$, sodium perborate monohydrate, sodium perborate tetrahydrate, sodium persilicate, sodium peroxide and calcium peroxide. From among these, sodium percarbonate, sodium perborate monohydrate and sodium perborate tetrahydrate are particularly preferable.

The organic acid peroxide represented by general formula (I) can be used as is for the bleaching composition of the present invention. However, in view of the storage stability of organic acid peroxide, it is preferable to produce the above organic acid peroxide at the time of use. In other words, it is preferable to combine the hydrogen peroxide or peroxide that produces hydrogen peroxide in aqueous solution, and the organic acid peroxide precursor (bleaching activator) that produces the above organic acid peroxide upon reaction with the hydrogen peroxide at the time of use.

Examples of organic acid peroxide precursors which produce the above organic acid peroxide (I) include the following:

(1) Acid anhydride of the organic acid represented with general formula (II) indicated below:

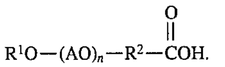
(II)

(wherein $R^1$, $R^2$, A and n have the same meanings as in the previous formulae).

Examples of organic acid (II) include methoxyacetic acid, 2-methoxypropionic acid, p-methoxybenzoic acid, ethoxyacetic acid, 2-ethoxypropionic acid, p-ethoxybenzoic acid, propoxyacetic acid, 2-propoxypropionic acid, p-propoxybenzoic acid, butoxyacetic acid, 2-butoxypropionic acid, p-butoxybenzoic acid, 2-methoxyethoxyacetic acid, 2-methoxy-1-methylethoxyacetic acid, 2-methoxy- 2-methylethoxyacetic acid, 2-ethoxyethoxyacetic acid, 2-( 2-ethoxyethoxy)propionic acid, p-(2-ethoxyethoxy)benzoic acid, 2-ethoxy-l-methylethoxyacetic acid, 2-ethoxy-2-methylethoxyacetic acid, 2-propoxyethoxyacetic acid, 2-propoxy-1-methylethoxyacetic acid, 2-propoxy-2-methylethoxyacetic acid, 2-butoxyethoxyacetic acid, 2-butoxy-1-methylethoxyacetic acid, 2-butoxy-2-methylethoxyacetic acid, 2-(2-methoxyethoxy)ethoxyacetic acid, 2-(2-methoxy-1-methylethoxy)ethoxyacetic acid, 2-(2-methoxy-2-methylethoxy)ethoxyacetic acid and 2-(2-ethoxyethoxy)ethoxyacetic acid.

(2) Ester of organic acid (II) and the alcohol represented with general formula (III) indicated below:

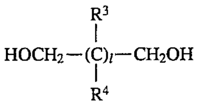
(III)

(wherein $R^3$ and $R^4$ represent identical or different hydrogen atoms, methyl groups, ethyl groups, hydroxyl groups or hydroxyalkyl groups having 1–3 carbon atoms, and 1 represents an integer from 1–10).

Examples of alcohol (III) include trimethylene glycol, tetramethylene glycol, hexamethylene glycol, neopentyl glycol, trimethylolpropane, pentaerythritol and sorbitol;

(3) Ester of organic acid (II) and the alcohol represented with general formula (IV) indicated below:

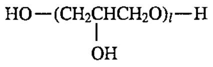
(IV)

(wherein 1 has the same meaning as in the previous formulae).

Examples of alcohol (IV) include glycerin and polyglycerins such as diglycerin and triglycerin;

(4) Ester of organic acid (II) and the alcohol represented with general formula (V) indicated below:

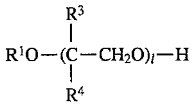
(V)

(wherein hydrogen or $R^1$, an alkyl having 1 to 5 carbon atoms, $R^3$, $R^4$ and l have the same meanings as in the previous formulae).

Examples of alcohol (V) include ethylene glycol and polyethylene glycols such as diethylene glycol and triethylene glycol and ethylcaritol;

(5) Ester of organic acid (II) and the quaternary amino alcohol represented with general formula (VI) indicated below:

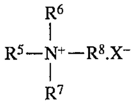
(VI)

(wherein $R^5$, $R^6$, $R^7$ and $R^8$ represent identical or different hydrogen atoms, straight chain or branched chain alkyl groups or alkenyl groups having 1–22 carbon atoms, or hydroxyalkyl groups having 1–3 carbon atoms, with at least one group being a hydroxyalkyl group having 1–3 carbon atoms, and X represents a halogen atom).

Examples of alcohol (VI) include hydroxyalkylammonium compounds such as N,N,N-trimethyl-N-hydroxymethylammonium chloride, N,N,N-trimethyl-N-hydroxyethylammonium chloride and N-oleyl-N,N-dimethyl-N-hydroxymethylammonium bromide;

(6) Ester of organic acid (II) and a cyclic alcohol or cyclic polyhydroxyalcohol.

Examples of cyclic alcohols or cyclic polyhydroxyalcohols include spiroglycol compounds such as 3,9-bis(1-hydroxymethyl- 1-methylpropyl)-2,4,8,10-tetraoxaspiro [5,5] undecane and 3,9-bis(1-ethyl-1-hydroxymethylpropyl)-2,4,8,10-tetraoxaspiro[_ 5,5]undecane;sorbitane; sugars such as glucose, maltose, lactose, sucrose, cellobiose, fructose and galactose; and, sugars substituted with an alkyl group having 1–18 carbon atoms;

(7) Acid amide of organic acid (II) and the amine represented with general formula (VIII) indicated below:

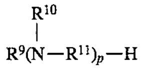
(VIII)

(wherein $R^9$ and $R^{10}$ represent either identical or different hydrogen atoms, straight chain or branched chain alkyl or alkenyl groups having 1–22 carbon atoms or hydroxyalkyl groups having 1–3 carbon atoms, or may form a saturated or unsaturated ring by bonding with each other; at least one of the groups from among $R^9$ and p number of $R^{10}$ represents a hydrogen atom; and, $R^{11}$ represents an alkylene group having 1–3 carbon atoms or an oxyalkylene group having 1–3 carbon atoms, while p represents an integer from 1 to 3).

Examples of amine (VIII) include ethylamine, isopropylamine, 2-ethylhexylamine, oleylamine, diethylamine, diisopropylamine, diisobutylamine, monoethanolamine, diethanolamine, ethylenediamine, diethylenetriamine, piperidine, morpholine, pyrrole and imidazole;

(8) Other examples of organic acid peroxide precursors include the ester of organic acid (II) and 1,3-dihydroxyacetone or N-hydroxysuccinimide, as well as the acid imide of organic acid (II) and pyroglutamic acid.

From the organic acid peroxide precursors that have been listed above, esters of organic acid (II) and ethylene glycol, diethylene glycol or glycerin, or the acid imide of organic acid (II) and ethylenediamine are particularly preferable.

Although organic acid peroxide precursors are susceptible to decomposition during storage in the presence of slight amounts of moisture, air (oxygen) and trace metals and when subjected to light, stability can be improved by adding a small amount of antioxidant to the organic acid peroxide precursor.

Although commonly known substances can be used as antioxidants, those that are preferable include phenol-based antioxidants such as 3,5-di-tert-butyl-4-hydroxytoluene and 2,5-di-tert-butylhydroquinone; amine-based antioxidants such as N,N'-diphenyl-p-phenylenediamine and phenyl-4-piperizinyl-carbonate; sulfur-based antioxidants such as didodecyl-3,3'-thiodipropionate and ditridecyl-3,3'-thiodipropionate; phosphor-based antioxidants such as tris(isodecyl)phosphate and triphenylphosphate; and, natural antioxidants such as L-ascorbic acid, its sodium salts and DL-α-tocopherol. These antioxidants may be used independently or in combinations of two or more. From among these, 3,5-di-tert-butyl-4-hydroxytoluene, 2,5-di-tert-butylhydroquinone and DL-α-tocopherol are particularly preferable.

These antioxidants are blended into the bleaching composition of the present invention preferably at a proportion of 0.01–1.0 wt % of the organic acid peroxide precursor, and particularly preferably at a proportion of 0.05–0.5 wt %.

The hydrogen peroxide or peroxide that produces hydrogen peroxide in aqueous solution is blended into the mixture during use preferably at a proportion of 0.5–98 wt %, and particularly preferably at a proportion of 1–50 wt %, so that the effective oxygen concentration is preferably 0.1–3 wt %, and particularly preferably 0.2–2 wt %. In addition, the organic acid peroxide precursor is blended into the composition during use, preferably at a proportion of 0.1–50 wt % and particularly preferably at a proportion of 0.5–30 wt %.

In order to improve the effectiveness of the bleaching composition of the present invention, the pH is preferably adjusted to 5–13 and, particularly preferably to 6–10.5. Buffering agents may be blended into the composition for this purpose. Examples of buffering agents include alkali metal hydroxides such as sodium hydroxide and potassium hydroxide; amine derivatives such as ammonium hydroxide, mono-, di- and triethanol; alkali metal carbonates such as sodium carbonate and potassium carbonate; and alkali metal silicates such as sodium silicate and potassium silicate. In addition, alkali metal sulfates such as sodium sulfate, potassium sulfate and lithium sulfate; ammonium sulfate; alkali metal bicarbonates such as sodium bicarbonate, potassium bicarbonate and lithium bicarbonate; and, ammonium bicarbonate may be used to improve performance as necessary. These are preferably blended into the bleaching composition at a proportion of 0–30 wt %.

In addition, it is preferable that a surface active agent be blended into the bleaching composition of the present invention for the purpose of promoting penetration of the bleaching activity source into the soiling. Examples of surface active agents include non-ionic surface active agents such as alkylglycoside, polyoxyethylenealkylether, sorbitane fatty acid ester, polyoxyethylenesorbitan fatty acid ester, polyoxyethylene fatty acid ester, oxyethyleneoxypropylene block polymer (pluronic), fatty acid monoglyceride and amine oxide; anionic surface active agents such as soap, alkyl sulfate, alkylbenzene sulfonate, polyoxyethylenealkyl sulfate ester salt and sulfosuccinate monoester; mono- or dialkylamine and its polyoxyethylene addition products; cationic surface active agents such as mono- or di- long-chain alkyl quaternary ammonium salts; and, amphoteric surface activators such as carbobetaine, sulfobetaine and hydroxysulfobetaine. These are blended into the bleaching composition at preferably a proportion of 0.1–5 wt %.

Moreover, monoatols alcohols like methanol, ethanol and propanol; diols like ethylene glycol, diethylene glycol, triethylene glycol, propylene glycol, dipropylene glycol, butylene glycol and hexylene glycol; and, triols like glycerin may be added to the bleaching composition of the present invention as necessary. Furthermore, water soluble solvents such as mono- or diethers of lower monools and di- or triols like diethylene glycol methylether, ethylene glycol methylether, ethylene glycol monoethylether, diethylene glycol monoethylether, ethylene glycol monopropylether and diethylene glycol monopropylether; solubilizing agents such as p-toluene sodium sulfonate, xylene sodium sulfonate, alkenyl sodium sulfonate and uric acid; penetrating agents; suspending agents such as clay; inflammable, synthetic polymer thickeners; abrasives; pigments; and, perfumes may be blended into the bleaching composition within a range that does inhibit the effectiveness of the present invention.

| | |
|---|---|
| Hydrogen peroxide or peroxide that produces hydrogen peroxide in aqueous solution | 0.5–98% |
| Organic acid peroxide precursor | 0.1–50% |
| Buffering agent | 0–30% |
| Surface active agent | 0–5% |
| Water soluble solvent | 0–50% |
| Solubilizing agent | 0–10% |
| Thickener, Suspending agent | 0–5% |
| Abrasive | 0–20% |
| Pigment, dye, perfume, etc. | As suitable |

Although the bleaching composition of the present invention can be used in the form of a single preparation, it is preferable to package the hydrogen peroxide or peroxide that produces hydrogen peroxide in aqueous solution and the organic acid peroxide precursor in separate containers, and to mix them immediately prior to use (adding water as necessary) to form a solution, slurry or paste, and then immediately to coat or spray onto the target surface, as this eliminates any apprehension regarding storage stability. The effective oxygen concentration at the time of use is typically adjusted to 0.1–3% and preferably adjusted to 0.2–1%.

In the case the peroxide and organic acid peroxide precursor are solids, dissolving then in water is troublesome and tedious, thereby making these difficult for typical household use. The components of a bleaching composition for hard surface soiling that is suitable for use as a mold remover and is also easy to use are as follows:

| | |
|---|---|
| (a) Hydrogen peroxide | 1–6 wt %, preferably 1–4 wt % |
| (b) Above organic acid peroxide precursor, liquid at room temp. | 2–20 wt %, preferably 5–15 wt % |
| (c) Water soluble solvent | 1–50 wt %, preferably 1–30 wt % |
| (d) Water | Remainder |

In addition, the range of the pH of the above composition is 8–11.5, and preferably 9–10.5.

The above composition is prepared immediately prior to use. Pre-mixing those components that may be mixed together to form a liquid without resulting in storage stability problems results in added convenience during use.

For example, if an aqueous solution of hydrogen peroxide, liquid bleaching activator and alkaline solvent containing water is used, which allows the above components to be mixed in a single operation immediately prior to use, its ease of use will be in no way inferior to conventional hypochlorous acid based bleach sprays. Other arbitrary components should be added in advance in order to prevent decreases in storage stability and effectiveness.

Furthermore, the components and pH of the above composition are the components and pH of the mixture immediately prior to use after mixing. Water soluble solvent (c) not only serves to improve bleaching strength, but also acts to stabilize the bubbles that are necessary when using the composition of the present invention in its spray form.

Accordingly, as the present invention is able to provide a bleaching composition for hard surface soiling that has no irritating odor and also demonstrates superior bleaching strength of considerable duration, it is possible to overcome the problems of conventional bleaches for hard surface soiling that are encountered during practical use.

DESCRIPTION OF THE PREFERRED EMBODIMENTS

Although the following describes the preferred embodiments of the present invention, the present invention is not limited to these preferred embodiments.

Bleaching Strength Measurement Method

A model mold plate was placed horizontally and 40 μl of an aqueous solution of mold remover composition was dropped onto the plate. After allowing the solution to stand for 30 minutes, the plate was washed with water and allowed to dry. After drying, lightness (L value) was measured using the Model 1001DP colorimeter made by Nippon Denki Kogyo Co., Ltd.

Model Mold Plate

The model plate was inoculated with *Cladosporium herbarum* and incubated at 30° C. for 14 days. A plastic plate (ABS plastic) was used for the model mold plate. (The L value of the plastic plate was 92.4 and the L value of the model mold plate was 60–70.)

Evaluation

The higher the L value the greater the mold bleaching strength. The measured L values are indicated as shown below.

L Value
90 or greater O
86–89 ◬
81–85
80 or less X

Odor

The odor of the aqueous solution of mold removal composition was evaluated by 10 panelists.

O: Absence of irritating or foul odor
X: Presence of irritating or foul odor

Embodiment 1

Aqueous solutions of mold removal compositions (effective oxygen concentration of approximately 0.5%) containing 3% of hydrogen peroxide, 15% of potassium carbonate and 10% of the acid anhydrides indicated below were prepared, and submitted for bleaching strength and odor testing.

Those results are shown in Table 1.

TABLE 1

| Acid Anhydrides | Bleaching Strength | Odor |
|---|---|---|
| Methoxyacetic anhydride | O | O |
| Ethoxyacetic anhydride | O | O |
| Methoxypropionic anhydride | O | O |
| Anisic anhydride | O | O |

Embodiment 2

Aqueous solutions of mold removal composition (effective oxygen concentration of approximately 1.35%) containing 10% sodium percarbonate and 10% of the esters and amides indicated below 10% were prepared, and submitted for bleaching strength and odor testing. Those results are shown in Table 2.

TABLE 2

| Activator | Bleaching Strength | Odor |
|---|---|---|
| Embodiments | | |
| Methoxyacetic acid choline chloride ester | O | O |
| Monomethoxyacetic acid glycerol ester | O | O |
| Dimethoxyacetic acid glycol ester | O | O |
| Ethoxyacetic acid glycol ester | O | O |
| Ethoxyacetic acid N-hydroxysuccinimide ester | O | O |
| Ethoxy acid DL-pyroglutamic acide amide | O | O |
| Anisic acid choline chloride ester | O | O |
| Comparative Examples | | |
| Tetraacetylethylenediamine | O | X |
| Glucose pentaacetate | ◬ | X |
| Acetylcholine chloride | ◬ | X |

Embodiment 3

Aqueous solutions of mold removal compositions (effective oxygen concentration of approximately 0.5%) containing 3% of hydrogen peroxide, 15% of potassium carbonate and 10% of the various acid anhydrides indicated in Table 3 were prepared, and submitted for bleaching strength and odor testing.

Those results are shown in Table 3.

TABLE 3

| Acid Anhydride | Bleaching Strength (L Value) | Odor |
|---|---|---|
| 3,6-dioxa-heptanic anhydride | 89 | O |
| 3,6,9-trioxa-decanic anhydride | 89 | O |
| Butoxyacetic anhydride | 89 | O |

Embodiment 4

Aqueous solutions of mold removal compositions (effective oxygen concentration of approximately 1.35%) containing 10% sodium percarbonate, 10% of the esters indicated in Table 2 and 2% alkylglycoside were prepared, and submitted for bleaching strength and odor testing.

Those results are shown in Table 4.

Furthermore, the alkylglycoside used are represented by the general formula $R_1(OR_2)_xG_y$ (wherein $R_1=C_{10}$, x=0, y=1.35 and G is a glucose residue).

TABLE 4

| Ester | Bleaching Strength (L Value) | Odor |
|---|---|---|
| Diester of 3,6-dioxa-heptanic acid and ethylene glycol | 92 | O |
| Diester of 3,6,9-trioxa-decanic acid and ethylene glycol | 92 | O |
| Diester of butoxyacetic acid and glycerin | 92 | |
| Tetraacetylethylenediamine* | 90 | X |

Note: Comparative example

Embodiment 5

Aqueous solutions of mold removal compositions (effective oxygen concentration of approximately 1.35%) containing 10% sodium percarbonate, 10% of the esters indicated in Table 2 and 2% alkylglycoside were prepared, and submitted for bleaching strength and odor testing.

Those results are shown in Table 5.

Furthermore, the alkylglycoside used are represented by the general formula $R_1(OR_2)_xG_y$ (wherein $R_1=C_{10}$, x=0, y=1.35 and G is a glucose residue).

TABLE 5

| Ester | | | | | Evaluation | |
|---|---|---|---|---|---|---|
| | | | | | Bleaching | |
| $R_1$ | AO | n | $R_2$ | Polyatomic Alcohol | Strength | Odor |
| | | | | Embodiments | | |
| $CH_3$ | — | — | $C_3H_6$ | Glycerol (diester) | 92 | O |
| " | — | — | $C_6H_{12}$ | | 92 | O |
| " | — | — | $C_7H_{14}$ | Sorbitol (monoester) | 92 | O |
| $C_5H_{11}$ | PO*2 | 3 | " | Propylene glycol (diester) | 92 | O |
| $C_2H_5$ | $E^nO$ | 3 | $C_2H_4$ | Pentaerythritol (monoester) | 92 | O |
| " | " | 2 | $C_6H_{12}$ | Glucose (monoester) | 92 | O |
| | | | | Comparative Examples | | |
| Tetraacetylethylenediamine | | | | | 90 | X |
| Tetraacetylglycoluryl | | | | | 88 | X |
| Pentaerythritoltetraacetate | | | | | 86 | X |

Note:
*1 Oxyethylene group
*2 Oxypropylene group

Embodiment 6

The lavatory-use bleaching composition indicated in Table 6 was prepared and evaluations of bleaching strength and odor were conducted as described below.

Furthermore, the substances indicated in Table 7 were used for the organic acid peroxide precursors.

TABLE 6

| | |
|---|---|
| Sodium percarbonate (PC) | 10% (effective oxygen concentration: 1.35%) |
| Organic acid peroxide precursor (Table 2) | No. of moles equal to effective oxygen concentration of PC |
| Lauryldiglycoside | 2% |
| De-ionized water | Remainder |

Bleaching Strength Measurement Method

Urinals were used for 14 days without rinsing with water after use. 5ml of bleaching composition having the compositions indicated in Table 1 were sprinkled on the soiling in the urinals. After allowing to stand for 15 minutes, the urinals were rinsed with water and the bleaching effects were visually evaluated. The evaluation standards used at that time are as indicated below.

4: Soiling was removed extremely well
3: Soiling was removed considerably
2: Soiling was removed somewhat
1: Soiling was not removed at all Furthermore, the points in Table 7 are the average values of 10 evaluators.

Odor

The odor of the lavatory-use bleaching composition was evaluated by 10 panelists.

O: Absence of irritating or foul odor
X: Presence of irritating or foul odor

These results are indicated in Table 7.

TABLE 7

| No. | Organic Acid Peroxide Precursor | Evaluation Score | Odor |
|---|---|---|---|
| | Embodiments | | |
| 1 | Methoxyacetic acid ethylene glycol diester | 3.9 | O |
| 2 | Ethoxyacetic acid glycerol monoester | 3.8 | O |

TABLE 7-continued

| No. | Organic Acid Peroxide Precursor | Evaluation Score | Odor |
|---|---|---|---|
| 3 | 3,6-dioxaheptanic acid diethylene glycol diester | 3.6 | O |
| 4 | 3,6,9-trioxadecanic acid glucose pentaester | 3.6 | O |
| 5 | 3,6-dioxaoctanic acid ethylene glycol diester | 3.9 | O |
| 6 | 3,6,9-trioxaundecanic acid ethylene glycol monoester | 3.8 | O |
| 7 | Anisic acid choline chloride ester | 3.7 | O |
| 8 | Ethoxyacetic acid N-hydroxysuccin-imide ester | 3.6 | O |
| 9 | Ethoxyacetic acid DL-pyroglutamic acid amide | 3.6 | O |
| 10 | Methoxypropionic anhydride | 3.5 | O |
| 11 | Butoxyacetic acid glycerin diester | 3.9 | O |
| | Comparative Examples | | |
| 12 | Tetraacetylethylenediamine | 3.0 | X |
| 13 | Glucose pentaacetate | 3.0 | X |
| 14 | Nonanoyloxibenzene sodium sulfonate | 1.2 | O |
| 15 | 5% sodium hypochlorite solution | 3.9 | X |

Embodiment 7

Artificially created model drain pipe soiling consisting of 100 g of powdered soap, 50 g of soybean oil, 50 g of rape seed oil and 100 g of liquid paraffin were added to and thoroughly mixed with 10kg of 100° DH hard water. This was then circulated through a transparent polyvinyl hose having an inner diameter of 1.2 cm using a circulating pump.

When the mixture was circulated for 5–6 hours, model sludge began to accumulate over the entire surface of the inner walls of the polyvinyl hose. This soiling was not able to be removed with water rinsing alone to any significant degree.

After one end of the above hose, cut to a length of 30 cm, was sealed with a rubber stopper and 3 g of the bleaches having the compositions indicated below were added to the other end of the hose, the hose portions were placed upright in a test tube holder and water was poured in until the hoses were nearly full.

After a fixed period of time, the hoses were observed for the degree to which the model sludge had been removed.

Those results are indicated in Table 8.

| Bleach 1 (Embodiment) | |
|---|---|
| Sodium percarbonate | 45% |
| 3,6-dioxaheptanic acid diethylene glycol diester | 45% |
| Polyoxethylenlaurylether (no. of moles added: 6) | 5% |
| Sodium carbonate | 5% |

| Bleach 2 (Comparative Example) | |
|---|---|
| Sodium percarbonate | 75% |
| Polyoxethylenlaurylether (no. of moles added: 6) | 5% |
| Sodium carbonate | 20% |

TABLE 8

| | After 30 minutes | After 1 hour | After 2 hours | After 4 hours |
|---|---|---|---|---|
| Bleach 1 | ○ | ○ | ◎ | — |
| Bleach 2 | X | Δ | ○ | ◎ |

Furthermore, the symbols used in the table refer to the following:

◎: Soiling removed from 95% or more of inner wall surface area

○: Soiling removed from 50–95% of inner wall surface area

Δ: Soiling removed from 20–50% of inner wall surface area

X: Soiling removed from 20% or less of inner wall surface area

Embodiment 8

The mold removers having the compositions indicated below were prepared and testing of mold removal was performed in the same manner as in Embodiment 1 by macroscopically observing the surface of the mold plates. Those testing results are indicated in Table 9.

| *Mold Removal Composition | |
|---|---|
| Hydrogen peroxide | 3 wt % |
| Monomethoxyacetic acid glycerol ester | 10 wt % |
| Potassium carbonate | 15 wt % |
| Ethyl alcohol | Amounts shown in Table 1 |
| Water | Remainder |

TABLE 9

| Amount of Ethyl Alcohol | Evaluation Results |
|---|---|
| 3 wt % | ◎ |
| 15 wt % | ◎ |
| 30 wt % | ○ |
| 45 wt % | ○ |

The evaluation standards used at that time are indicated below.

◎: Entire mold plate was bleached

○: A few unbleached portions remain

Embodiment 9

| | | |
|---|---|---|
| (1) | 5% hydrogen peroxide aqueous solution | 45 wt % |
| (2) | Diester of 3,6-dioxaheptanic acid and ethylene glycol | 10 wt % |
| (3) | Aqueous solution containing: | 45 wt % |
| | Potassium carbonate | 40 wt % |
| | Ethylene glycol monomethylether | 5 wt % |
| | Alkylglycoside | 4 wt % |

A separately packaged container containing solutions (1) through (3) above was attached to a spray container. This was then mixed immediately prior to use (pH 10.5) and sprayed onto the tile joints of tile walls in a bathroom in which there was extensive mold growth. After allowing to stand for 1 hour and rinsing with water, nearly all of the mold was removed.

Embodiment 10

The bleaching compositions having the compositions indicated in Table 10 were prepared. After storing for 5, 20 and 60 days at 50° C., aqueous bleach solutions were prepared containing 10 wt % of the bleaching composition and 3 wt % of hydrogen peroxide (effective oxygen concentration approximately 0.5%) and 15% of potassium carbonate. These were then submitted for testing of bleaching strength and odor in the same manner as in Embodiment 1. Those results are indicated in Table 10.

TABLE 10

| | Bleaching Composition | | 5 Days Storage | | 20 Days Storage | | 60 Days Storage | |
|---|---|---|---|---|---|---|---|---|
| | Precursor | Antioxidant | L Value | Odor | L Value | Odor | L Value | Odor |
| Embodiment 1 | EA-EG*1 | BHT*6 200 ppm | 92 | ○ | 92 | ○ | 92 | ○ |
| Embodiment 2 | EEA-EG*2 | BHT*6 500 ppm | 92 | ○ | 92 | ○ | 92 | ○ |
| Embodiment 3 | BA-GLY*3 | BHT*6 800 ppm | 91 | ○ | 91 | ○ | 91 | ○ |
| Embodiment 4 | EE(AN)*4 | BHT*6 1000 ppm | 90 | ○ | 90 | ○ | 90 | ○ |
| Comparative Example 1 | EEA-EG*2 | Not added | 90 | ○ | 88 | ○ | 86 | ○ |

TABLE 10-continued

| | Bleaching Composition | | 5 Days Storage | | 20 Days Storage | | 60 Days Storage | |
|---|---|---|---|---|---|---|---|---|
| | Precursor | Antioxidant | L Value | Odor | L Value | Odor | L Value | Odor |
| Comparative Example 2 | EA-TEG*5 | Not added | 90 | O | 87 | O | 84 | X |

*1Diester of ethoxyacetic acid and ethylene glycol
*2Diester of 2-ethoxyethoxyacetic acid and ethylene glycol
*3Triester of butoxyacetic acid and glycerin
*4Acid anhydride of 2-ethoxyethoxyacetic acid
*5Diester of ethoxyacetic acid and triethylene glycol
*63,5-di-tert-butyl-4-hydroxytoluene

Embodiment 11

The bleaching compositions having the compositions indicated in Table 11 were prepared. After storing for 20 days at 50° C., aqueous bleach solutions were prepared containing 10 wt % of the bleaching compositions and 3 wt % of hydrogen peroxide (effective oxygen concentration approximately 0.5% ) and 15% of potassium carbonate. These were then submitted for testing of bleaching strength and odor in the same manner as in Embodiment 1. Those results are indicated in Table 11.

TABLE 11

| | Bleaching Composition | | Amount of Antioxidant Added (ppm) | | | | | |
|---|---|---|---|---|---|---|---|---|
| | Precursor | Antioxidant | L Value | Odor | L Value | Odor | L Value | Odor |
| Embodiment 5 | EA-EG*1 | BHT*5 | 92 | O | 92 | O | 92 | O |
| Embodiment 6 | EEA-EG*2 | Tocopherol | 92 | O | 92 | O | 92 | O |
| Embodiment 7 | BA-GLY*3 | BHT*5 | 91 | O | 91 | O | 91 | O |
| Embodiment 8 | EE(AN)*4 | BHT*5 | 90 | O | 90 | O | 90 | O |
| Comparative Example 3 | TAED*4 | BHT*5 | 91 | X | 91 | X | 91 | X |

*1Diester of 2-ethoxyethoxyacetic acid and ethylene glycol
*2Triester of butoxyacetic acid and glycerin
*3Acid anhydride of 2-ethoxyethoxyacetic acid
*4Tetraacetylethylenediamine
*53,5-di-tert-butyl-4-hydroxytoluene

We claim:

1. A bleaching composition comprising:

(a) hydrogen peroxide or a peroxide that produces hydrogen peroxide in aqueous solution, and (b) an organic acid peroxide precursor that produces an organic acid peroxide by reacting with said hydrogen peroxide or peroxide that produces hydrogen peroxide in aqueous solution, wherein said organic acid peroxide is represented by formula (I):

$$R^1O-(AO)_n-R^2-\overset{\overset{\displaystyle O}{\|}}{C}OOH \qquad (I)$$

wherein $R^1$ represents a straight chain or branched chain alkyl or alkenyl group having 1–5 carbon atoms, $R^2$ represents a straight chain or branched chain alkylene group having 1–8 carbon atoms or a phenylene group that may be substituted with a straight chain or branched chain alkyl group having 1–5 carbon atoms, A represents identical or different alkylene groups having from 2 to 4 carbon atoms, and n represents an integer from 1–100, and wherein said organic acid peroxide precursor is selected from the group consisting of:

(1) an acid anhydride of an organic acid represented by the formula (II)

$$R^1O-(AO)_n-R^2-COOH \qquad (II)$$

wherein $R^1$, $R^1$, A, and n have the same meanings as set forth above;

(2) an ester or an acid amide of said organic acid of formula (II) above and one of the compounds represented by formulae (III) through (VIII) below:

$$HOCH_2-(\underset{\displaystyle R^4}{\overset{\displaystyle R^3}{\overset{|}{\underset{|}{C}}}})_l-CH_2OH \qquad (III)$$

wherein $R^3$ and $R^4$ represent identical or different hydrogen atoms, methyl groups, ethyl groups, hydroxyl groups, or hydroxyalkyl groups having 1–3 carbon atoms and l represents an integer from 1–10;

$$HO-(CH_2\underset{\displaystyle OH}{\underset{|}{C}}HCH_2O)_l-H \qquad (IV)$$

wherein l has the same meaning as set forth above;

$$HO-(\underset{\displaystyle R^4}{\overset{\displaystyle R^3}{\overset{|}{\underset{|}{C}}}}-CH_2O)_l-H \qquad (V)$$

wherein $R^3$, $R^4$ and l have the same meanings as set forth above;

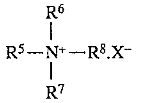

(VI)

wherein $R^5$, $R^6$, $R^7$, and $R^8$ represent identical or different hydrogen atoms, straight chain or branched chain alkyl groups or alkenyl groups having 1–22 carbon atoms, or hydroxyalkyl groups having 1–3 carbon atoms, with at least one group being a hydroxyalkyl group having 1–3 carbon atoms, and X represents a halogen atom;

cyclic alcohol or cyclic polyhydroxyalcohol (VII); and

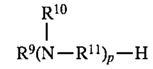

(VIII)

wherein $R^9$ and $R^{10}$ represent either identical or different hydrogen atoms, straight chain or branched chain alkyl or alkenyl groups having 1–22 carbon atoms or hydroxyalkyl groups having 1–3 carbon atoms, or $R^9$ and $R^{10}$ may form a saturated or unsaturated ring by bonding with each other; at least one of the groups from among $R^9$ and p number of $R^{10}$ represents a hydrogen atom; and $R^{11}$ represents an alkylene group having 1–3 carbon atoms or an oxyalkylene group having 1–3 carbon atoms, while p represents an integer from 1 to 3.

2. The bleaching composition described in claim 1 wherein said organic acid peroxide precursor is selected from the group consisting of an ester formed from the reaction of ethylene glycol, diethylene glycol or glycerin with an organic acid represented by general formula (II), and an acid amide formed from the reaction of ethylenediamine with an organic acid represented by the general formula (II).

3. The bleaching composition described in claim 1 wherein said organic acid peroxide precursor is such that $R_1$ is an alkyl group having 1–4 carbon atoms, $R_2$ is an alkylene having 1–3 carbon atoms or a phenylene group, A is an alkylene group having 2–3 carbon atoms, and n is an integer from 0–20.

4. The bleaching composition described in claim 1, wherein the proportion of hydrogen peroxide or peroxide that produces hydrogen peroxide is 0.5–98% and the proportion of organic acid peroxide precursor is 0.1–50%.

5. The bleaching composition described in claim 1, wherein the organic acid peroxide precursor is an ester of the organic acid of formula (II) and the compound of formula (III).

6. The bleaching composition described in claim 1, wherein the organic acid peroxide precursor is an ester of the organic acid of formula (II) and the compound of formula (IV).

7. The bleaching composition described in claim 1, wherein the organic acid peroxide precursor is an ester of the organic acid of formula (II) and the compound of formula (V).

8. The bleaching composition described in claim 1, wherein the organic acid peroxide precursor is an acid amide of the organic acid of formula (II) and the compound of formula (VI).

9. The bleaching composition described in claim 1, wherein the organic acid peroxide precursor is an ester of the organic acid of formula (II) and the cyclic alcohol or cyclic polyhydroxyalcohol of formula (VII).

10. The bleaching composition described in claim 1, wherein the organic acid peroxide precursor is an acid amide of the organic acid of formula (II) and the compound of formula (VIII).

11. The bleaching composition described in claim 1, wherein said bleaching composition further comprises an antioxidant.

12. The bleaching composition described in claim 11, further comprising a buffer.

13. The bleaching composition described in claim 11 wherein paid antioxidant is selected from 3,5-di-tert-butyl-4-hydroxytoluene, DL-α-tocopherol and 2,5-di-tert-butylhydroxyquinone.

14. The bleaching composition described in claim 11 or 13, wherein said antioxidant is blended at a proportion of 0.01–1.0 wt % of said organic acid peroxide precursor.

* * * * *

UNITED STATES PATENT AND TRADEMARK OFFICE
CERTIFICATE OF CORRECTION

PATENT NO. : 5,545,349
DATED : August 13, 1996
INVENTOR(S) : Jun KURII et al.

It is certified that error appears in the above-indentified patent and that said Letters Patent is hereby corrected as shown below:

On the title page, item 63, change "Continuation of Ser. No. 598,631, filed as PCT/JP90/0943, published as WO91/03542, Mar. 21, 1991, abandoned." to --Continuation of Ser. No. 07/598,631, filed October 23, 1990, abandoned, which was the national stage international application number PCT/JP90/00943, filed July 23, 1990.--.

Signed and Sealed this

Seventh Day of January, 1997

Attest:

BRUCE LEHMAN

*Attesting Officer* *Commissioner of Patents and Trademarks*